(12) United States Patent
Tsirulnik et al.

(10) Patent No.: US 10,216,776 B2
(45) Date of Patent: Feb. 26, 2019

(54) VARIANCE BASED TIME SERIES DATASET ALIGNMENT

(71) Applicant: Hewlett-Packard Development Company, L.P., Houston, TX (US)

(72) Inventors: Luba Tsirulnik, Yehud (IL); Gabriel Dayan, Yehud (IL); Pavel Danichev, Yehud (IL)

(73) Assignee: Entit Software LLC, Sunnyvale, CA (US)

( * ) Notice: Subject to any disclaimer, the term of this patent is extended or adjusted under 35 U.S.C. 154(b) by 797 days.

(21) Appl. No.: 14/795,280

(22) Filed: Jul. 9, 2015

(65) Prior Publication Data

US 2017/0011098 A1    Jan. 12, 2017

(51) Int. Cl.
*G06F 17/30*     (2006.01)

(52) U.S. Cl.
CPC ............................ *G06F 17/30315* (2013.01)

(58) Field of Classification Search
CPC .................................................. G06F 17/30315
USPC .......................................................... 707/758
See application file for complete search history.

(56) References Cited

U.S. PATENT DOCUMENTS

| | | | |
|---|---|---|---|
| 8,051,162 B2 | 11/2011 | Arlitt et al. | |
| 8,286,237 B2 | 10/2012 | Moghe | |
| 8,375,255 B2 | 2/2013 | Wang et al. | |
| 2011/0185234 A1 | 7/2011 | Cohen et al. | |
| 2012/0197852 A1 | 8/2012 | Dutta et al. | |
| 2013/0304909 A1 | 11/2013 | Pappu | |
| 2014/0096249 A1 | 4/2014 | Dupant et al. | |
| 2014/0149273 A1* | 5/2014 | Angell | G06Q 40/04 705/37 |
| 2014/0214763 A1* | 7/2014 | Haas | G06F 17/30575 707/634 |
| 2014/0324862 A1 | 10/2014 | Bingham et al. | |
| 2015/0142935 A1 | 5/2015 | Srinivas et al. | |
| 2015/0201303 A1* | 7/2015 | Ji | H04W 4/08 455/456.1 |
| 2015/0212868 A1 | 7/2015 | Chen et al. | |
| 2017/0011098 A1 | 1/2017 | Tsirulnik et al. | |

FOREIGN PATENT DOCUMENTS

WO    WO2014120161    8/2014

OTHER PUBLICATIONS

Li, W. et al., Unraveling Complex Temporal Associations in Cellular Systems Across Multiple Time-series Microarray Datasets, (Research Paper), Aug. 2010, 11 Pages.

(Continued)

*Primary Examiner* — Joshua Bullock

(57) ABSTRACT

An example process for aligning time-series datasets includes receiving a first time-series dataset and a second time-series dataset. The first time-series dataset can include a first set of values associated with respective time stamps and the second time-series dataset can include a second set of values associated with respective time stamps. The process also includes determining degrees of variance of the first and second sets of values, and comparing each degree of variance with a threshold. The process also includes selecting among multiple time alignment processes based on the comparisons, and processing the time-series datasets according to the selected process to thereby generate an aligned time-series dataset.

18 Claims, 9 Drawing Sheets

(56) References Cited

OTHER PUBLICATIONS

Pandria, N. et al., Testing the Correlation of Time Series Using Dynamic Time Warping, (Research Paper), Apr. 24, 2014, 25 Pages.
International Searching Authority; International Search Report and Written Opinion dated Jul. 26, 2016 for PCT Application No. PCT/US2015/062991 Filed Nov. 30, 2015, 14 pages.
Nychis, G.; "An Empirical Evaluation of Entropy-based Traffic Anomaly Detection"; In Proceedings of the 8th ACM SIGCOMM Conference on Internet Measurement; Oct. 2008, pp. 151-156. ACM (6 pages).
Shyu, Mei-Ling; "A Novel Anomaly Detection Scheme Based on Principal Component Classifier"; Miami University, Coral Gables, FL., Department of Electrical and Computer Engineering; 2003, 10 pages.

\* cited by examiner

VARIANCE BASED TIME SERIES DATASET ALIGNMENT

BACKGROUND

Monitoring computer networks and other complex systems may involve obtaining and analyzing time-series data from a variety of sources. For instance, a data center may include thousands of computer systems and network devices that interconnect those computer systems.

BRIEF DESCRIPTION OF THE DRAWINGS

The following detailed description references the drawings, wherein:

FIG. 60 illustrates an example time alignment process for generating an aligned time-series dataset.

DETAILED DESCRIPTION

Figure 1:
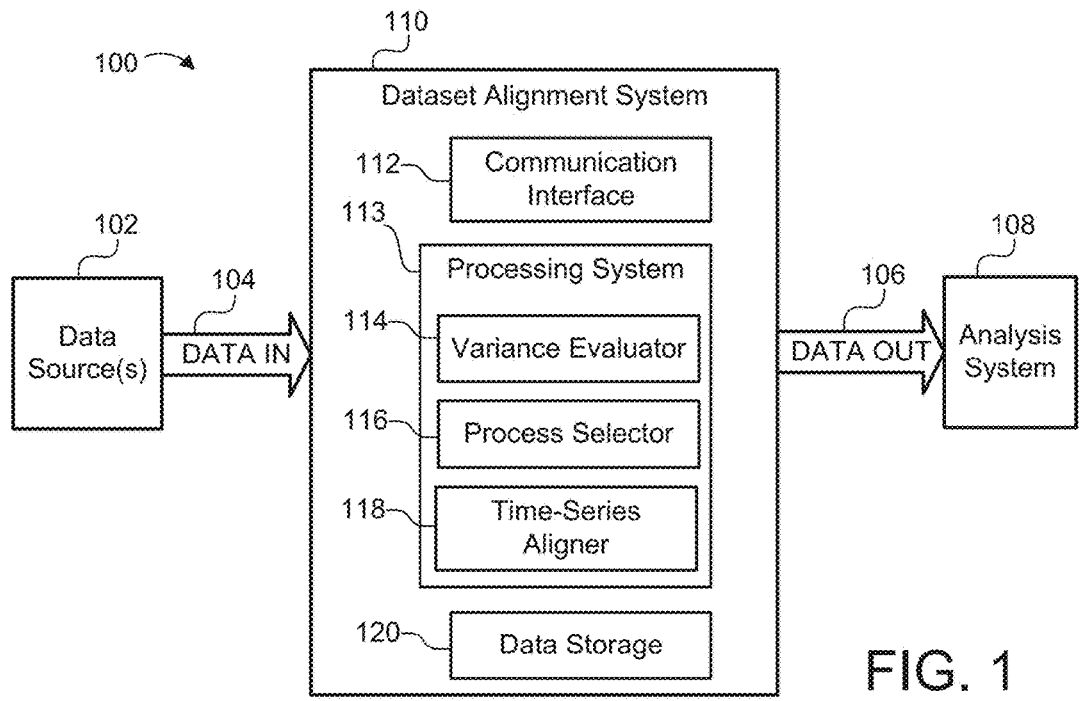
FIG. 1 is a block diagram of an example system for aligning time-series datasets.

The following description makes reference to the accompanying drawings, in which similar symbols identify similar components, unless context dictates otherwise. The descriptions herein, as well as the drawings, present examples of the subject matter of the present disclosure and are in no way limiting in regard to the subject matter disclosed herein. Throughout the description, the singular forms of "a", "an", and "the" mean "one or more". Thus, various examples in which a component is described in singular form also apply to examples having multiple of those components. Moreover, some aspects of the examples presented herein may be modified, re-arranged, re-ordered substituted, combined, and/or separated in a variety of different configurations without departing from the subject matter of the present disclosure.

As described herein, a time-series dataset is a set of values each associated with its own time stamp. Accordingly, a time-series dataset may be implemented as a two column array of numbers, with one column populated by a sequence of time stamps, and the other populated with a set of values measured and/or obtained at each of those time stamps. Two time-series datasets may be analyzed to determine the degree of correlation between the datasets. One example measure of correlation is the Pearson product-moment correlation coefficient, which is also referred to as the PPMCC, Pearson's r, or the PCC. The PCC is a normalized measure of the linear correlation between two sets of data. For any two datasets, the PCC is always between +1 and −1 inclusive. A PCC of +1 indicates total positive correlation, 0 indicates no correlation, and −1 indicates total negative correlation. While correlation does not always prove causation, a strong correlation between two datasets can be a useful tool when analyzing multiple data steams to identify relationships between different quantities.

As noted above, many systems are analyzed and monitored using time-series datasets collected from various sources. For example, in a networked computer system, system components may have sensors that measure physical parameters such as ambient temperature, on-chip temperature, fan speeds, etc. Such components may generate diagnostic reports or metrics related to performance such as logs of network throughput, memory utilization, cpu speed, etc. All of these data sources can then be reported to monitoring and/or analysis hubs as time-series datasets. Network administrators and others responsible for large computer networks and other complex systems may use real time streams of time-series datasets to identify issues affecting performance of the system and also diagnose the root cause of those issues to facilitate resolution as soon as possible.

However, in some examples, the datasets may not be temporally aligned with one another. Datasets from different sources may have different aggregation intervals and/or different aggregation offsets. Moreover, some datasets may have missing data points perhaps due to faulty sensor(s), faulty communication link(s), and/or other issues. Further, some datasets may not include periodically spaced data such that subsequent time stamps are separated by a regular time spacing. For instance, some sources of diagnostically relevant information may cause reports, logs, or the like generated upon the occurrence of particular events and/or satisfaction of particular conditions. As a consequence, the multitude of time-series datasets available for analysis may not have a sequence of identical time stamps.

Some aspects of the present disclosure provide a technique for automatically aligning two datasets in time. The present disclosure provides example techniques in which a processing system can receive two datasets with values that are not aligned at common time stamps, and generate two new datasets with paired values that are aligned at common time stamps or at similar time stamps. In some cases, the alignment process may involve interpolating between values in one or both of the original datasets to generate new values for the aligned dataset. In some cases, the alignment process may involve filtering the two datasets to identify pairs of values within some temporal tolerance of one another. For example, the disclosed technique may involve first evaluating the degree of variance of the received datasets and selecting an alignment process based on the evaluated degree of variance. Thus, the time alignment process may be adjusted for particular datasets depending on the degree of variance of those datasets.

The variance of a dataset is a non-negative parameter that quantifies the spread of the values in that dataset. Thus, if a set of observed/measured values in a time-series dataset is expected to assume a particular pattern, such as a trend defined by a function with respect to time, the variance quantifies the extent to which the set of values might deviate from the expected pattern. In an example in which the values are expected to maintain a stable value, non-varying value, the variance quantifies the differences between each value in the population and that non-varying value—which may be the mean of the values in the sample. For a dataset X with n values $X[i]$, $i=1 \ldots n$, having mean $\overline{X}$, and with respective expectation values $E[i]$, $i=1 \ldots n$, the variance $\sigma^2$ defined as:

$$\sigma^2 = \frac{1}{n}\sum_{i=1}^{n}(X[i] - E[i])^2,$$

$$\text{for } E[i] = \overline{X}, \sigma^2 = \frac{1}{n}\sum_{i=1}^{n}(X[i] - \overline{X})^2 = \left(\frac{1}{n}\sum_{i=1}^{n}(X[i])^2\right) - \overline{X}^2$$

In some examples, evaluating the degree of variance of a dataset involves computing an autocorrelation of the values in the dataset. The autocorrelation can then be compared with a threshold. Datasets above the threshold may be considered smooth and datasets below the threshold may be considered not smooth (or noisy). In some examples, the time alignment process may involve performing interpolations between values of a smooth dataset to generate interpolated values at time stamps of the other dataset. Such an interpolated value can then be paired with the value of the other dataset having the same time stamp used to perform the interpolation. The pair can then be included in an aligned time-series dataset, with each associated with the same time stamp. When aligning two datasets that are both smooth, the time alignment process may involve interpolating each dataset with respect to the time stamps of the other dataset. Thus, an aligned time-series dataset generated from two smooth datasets may have approximately the same number of entries as both of the smooth datasets combined together. For two noisy datasets, the time alignment process may involve filtering the datasets to identify pairs of time stamps—one from each dataset—that are within a temporal tolerance of one another. The identified subset of time stamp pairs, and their associated values, can then be paired and included in an aligned time-series dataset.

Upon analyzing aligned time-series datasets, the results may be used as a basis to trigger an action and/or results may be displayed on a user interface for review by an administrator. For example, computing the PCC requires two aligned datasets, and so the alignment processes can be used to align time-series datasets before computing the PCC. For instance, PCC values may be computed between numerous streaming datasets and then those datasets may be ordered based on their respective PCC values. Further still, the user interface may include charts, graphs, and/or other graphics for visualizing the received values (e.g., performance metrics) over time. Providing visualization could help the administrator when analyzing system performance and in identifying relationships between the received values.

FIG. 1 is a block diagram of an example system 100 for aligning time-series datasets. The system 100 includes a data alignment system 110, a data source 102, which sends input data 104 to the dataset alignment system 110, and an analysis system 108, which receives output data 106 from the dataset alignment system 110. The dataset alignment system 110 includes a communication interface 112, a processing system 113, and data storage 120. The processing system 113 may be communicatively coupled to the communication interface 112 and the data storage 120 via a bus and/or network. The processing system 113 can include functional modules that perform predetermined tasks and/or routines. These functional modules include a variance evaluator 114, a process selector 116, and a time-series aligner 118. In some examples, the dataset alignment system 110 may be a computing system having processor(s), memory, and instructions such as software and/or firmware features stored in the memory that define processes performed by the computing system upon execution of such features by the processor(s). In some examples, the dataset alignment system 110 may include hardware features to perform processes described herein, such as logical circuit(s), application specific integrated circuit(s), etc.

The communication interface 112 may receive the input data 104 from the data source 102 via a communication network. For instance, the data source 102 may include sensors and/or status reporting modules on multiple computers in a network of computing systems that are linked via a network. The communication interface 112 may include a network interface card (NIC) or another component to receive signals from a communication path, demodulate and/or decode the data from the signals, and/or apply error correction to retrieve data packet(s), header information, etc. in accordance with various communication protocols. The communication interface 112 may also send data to another terminal by generating data packets, header information, and so forth; encoding and/or modulating a signal based on the data to be communicated; and transmitting the signal. Moreover, the communication interface 112 may perform decryption and encryption to facilitate secure communications according to various standards and protocols.

The variance evaluator 114 may determine a degree of variance of each received dataset. The variance evaluator 114 may perform an analysis on a dataset that generates a quantified representation of the degree of variance of that dataset. In some examples, the variance evaluator 114 may compute an autocorrelation of a dataset. For example, for a dataset X with n values X[i], i=1 . . . n, the autocorrelation of X can be computed between two versions of X, one delayed with respect to the other. For instance, for $A=\{X_1, \ldots, X_{n-1}\}$; $B=\{X_2, \ldots, X_n\}$:

$$r_{AB} = \frac{\text{cov}(A, B)}{\sigma_A \sigma_B} = \frac{\sum_{i=1}^{n-1}(A_i - \overline{A})(B_i - \overline{B})}{\sqrt{\sum_{i=1}^{n-1}(A_i - \overline{A})^2}\sqrt{\sum_{i=1}^{n-1}(B_i - \overline{B})^2}}$$

with $\overline{A}$ and $\overline{B}$ being the mean of A and B, respectively; and with $\sigma_A$ and $\sigma_B$ being the standard deviation of A and B, respectively. The autocorrelation $r_{AB}$ is a quantified representation of the degree of variance of the dataset X. Other measures of variance (or volatility) may be used in some examples. For example, the variance evaluator 114 may divide a time-series dataset into a set of time bins and compute standard deviations of the values within each time bin. The standard deviations may be used in combination with the average value in each bin and/or the domain of the dataset values to estimate the degree of variance of the dataset.

Figure 2A:
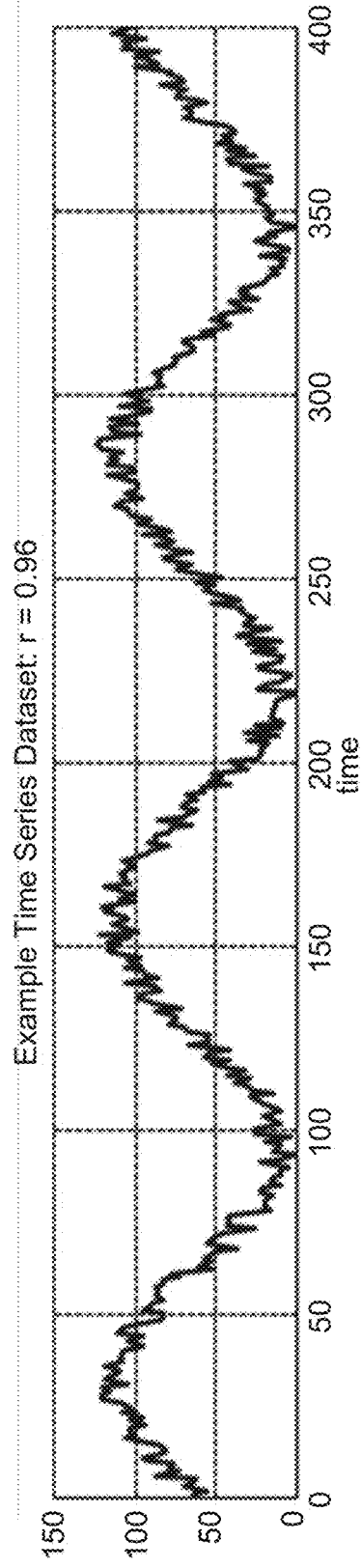
FIGS. 2A and 2B are charts of example time-series datasets with different degrees of variance.
Figure 2B:
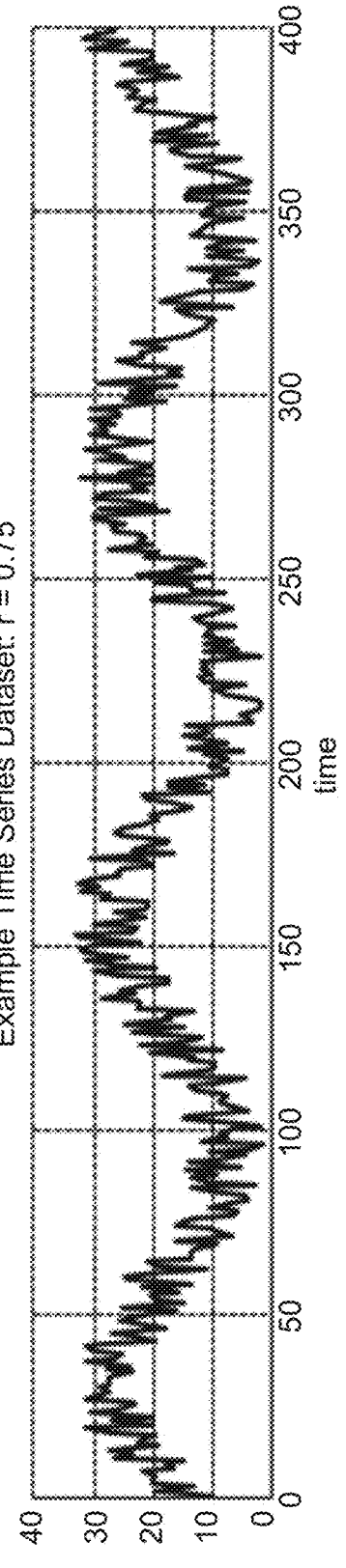

FIGS. 2A and 2B are charts of example time-series datasets with different degrees of variance. In particular, FIG. 2A shows an example dataset with an autocorrelation r=0.96, and FIG. 2B shows an example dataset with an autocorrelation r=0.75. As is apparent from a visual inspection of the two datasets, the dataset in FIG. 2A has a smoother discernible trend than the dataset in FIG. 2B. The nominal noise associated with a given point may be roughly comparable in absolute terms between the two datasets (e.g., approximately 10 units). Because the autocorrelation is normalized by the standard deviations of each dataset, the autocorrelation is greater for the dataset of FIG. 2A than for the dataset of FIG. 2B. Further, if a dataset has a standard deviation of zero (i.e., $\sigma_A=0$ or $\sigma_B=0$), the dataset is considered smooth. For example, a dataset with all values equal to a constant, stable value, the standard deviation is zero and the autocorrelation is undefined due to division by zero. However, such a dataset could sensibly be interpolated, and so the dataset is considered smooth.

The process selector 116 may select a time alignment process based on the degrees of variance determined by the variance evaluator 114. In some examples, the process selector 116 may compare the autocorrelations with a threshold to distinguish between datasets that are smooth and those that are not smooth. The process selector 116 may then select a time alignment process that is suitable for processing the two datasets based on the degree of variance of each. In practice, such selection may be based on whether each of the two datasets is in one of two states: smooth or not smooth, as determined by the threshold comparison. For example, for two arbitrary datasets, the degrees of variance determined by the variance evaluator 114 may indicate either: (1) both are smooth, (2) both are noisy, or (3) one is smooth and the other is noisy. The process selector 116 may select among 3 possible time alignment processes depending on which of the three smoothness states the two datasets are in. For instance, the process selector 116 may allow smooth datasets to be processed using interpolation techniques, but not allow such processing for datasets which are not smooth. Some examples of selections that may be made by the process selector 116 are described below in connection with FIGS. 5A and 5B, for example.

For examples in which the degree of variance is an autocorrelation, a threshold of approximately 0.8 may be used to distinguish between datasets which are smooth and those that are not. In the example datasets of FIGS. 2A and 2B, the dataset in FIG. 2A with an autocorrelation of 0.96, which is above 0.8, would be considered smooth. And the dataset in FIG. 2B with an autocorrelation of 0.75, which is below 0.8, would be considered not smooth. The precise value used for the threshold may depend on the nature of the datasets, the trends represented, and/or the source(s) from which the datasets originate. For examples in which the degree of variance of the dataset is an autocorrelation, the smoothness threshold has a value greater than 0.5, with datasets above the threshold considered smooth, and datasets below the threshold considered noisy. In practice, a skilled administrator may tune the smoothness threshold based on such factors and/or based on observed performance to achieve an automated time alignment process that sensibly distinguishes between smooth datasets and noisy datasets. Moreover, for other measures of degrees of variance, other thresholds may be used. In some cases, the quantified representation of the degree of variance generated by the variance evaluator 114 may be greater for greater extents of variance (e.g., a ratio of average standard deviation compared to domain). As such, the process selector 116 may recognize values less than a threshold as indicating a smooth dataset and values greater than the threshold as indicating a not smooth dataset.

The time-series aligner 118 may generate an aligned time-series dataset by processing the received input data 104 according to the process selected by the process selector 116. Example time alignment techniques are described in detail in connection with FIGS. 6A-6C. The generated time alignment dataset can then be sent (106) to the analysis system 108.

Data storage 120 can include a non-transitory machine-readable medium, and may include random access memory (RAM) and/or read-only memory (ROM) that stores data and executable instructions for causing the system 110 to operate as described herein. Data storage 120 may include indications of the multiple time alignment processes available for selection by the process selector 116. Data storage 120 may also store executable instructions for causing the variance evaluator 114 to compute a quantified value representing the degree of variance of a given dataset, instructions for causing the process selector 116 to select among multiple alignment processes based on the degrees of variance, and instructions for causing the time-series aligner 118 to process received datasets in accordance with the selected time alignment process to thereby generate an aligned time-series dataset. Further, volatile memory may be used to store received datasets and/or aligned time-series datasets during the performance of various computations by processing components of the time alignment system 110. Moreover, some or all of the machine-readable instructions used in implementing processes of the dataset alignment system 110 may be stored at a remote server that may receive calls for completing processes and returning results. In some examples, a remote server may be used to store indications of the multiple alignment processes from which the process selector 116 selects a time alignment process.

Figure 3:
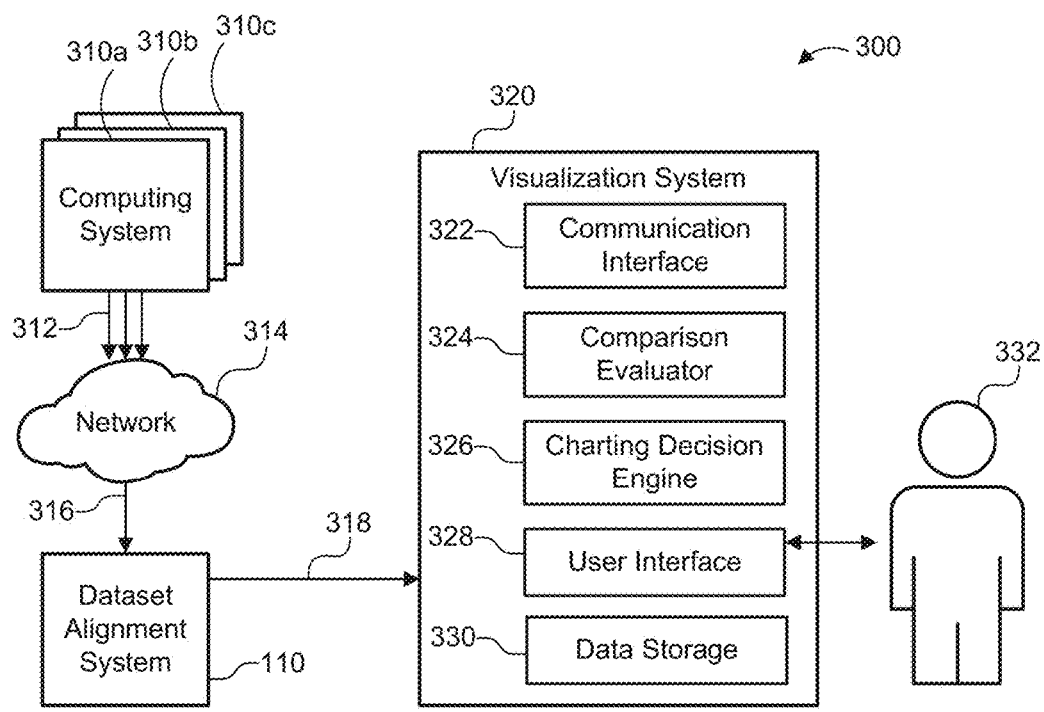
FIG. 3 is a block diagram of an example system in which a user can analyze time-series data from a computer network.

FIG. 3 is a block diagram of an example system 300 in which a user can analyze time-series data from a computer network. The system 300 includes the data alignment system 110, which receives input data 316 indicative of metrics, sensor measurements, and/or other information related to system performance for a group of networked computing systems 310*a-c*. In some examples, the computing systems 310*a-c* may be a group of networked computers (e.g., servers) in a data center. Each of the computing systems 310*a-c* may include sensors that measure parameters of the computing systems related to system performance. In some examples, the computing systems 310*a-c* may generate logs and/or metrics related to system performance (e.g., memory utilization, CPU speed or utilization, network bandwidth, etc.). The computing systems 310*a-c* may transmit such data 312 via communication network 314 to the dataset alignment system 110. The dataset alignment system 110 can then analyze the received datasets and generate an aligned time-series dataset as described above. The dataset alignment system 110 can send the generated aligned time-series datasets 318 to a visualization system 320.

The visualization system 320 may be a computer system with a communication interface 322, a comparison evaluator 324, a charting decision engine 326, a user interface 328, and data storage 330. The communication interface 322 may receive the datasets 318 from the dataset alignment system 320. For instance, the communication interface 322 may be similar to the communication interface 112 described above in connection with system 110. The comparison evaluator 324 may compute values indicative of degrees of similarity between multiple aligned time-series datasets. The comparison evaluator 324 may generate a PCC for at least two aligned time-series datasets. In some examples, the comparison evaluator 324 may generate PCCs for each independent pair of multiple aligned time-series datasets. The PCCs for each independent pair can be used to infer relationships between various datasets. For example, the degree of correlation between datasets for measurements and/or metrics related to system performance may be used to infer relationships between those measurements and/or metrics.

In addition, the visualization system 320 may include the charting decision engine 326. The charting decision engine 326 may generate a chart, graph, or the like of of the received metrics and/or measurements. The charting decision engine 326 may determine which ones of multiple datasets to include in such a graph. For example, the charting decision engine 326 may select a pair of metrics/measurements with the greatest PCC. In some examples, the charting decision engine 326 may automatically select a scaling, formatting, or the like for the chart displayed. For example, the charting decision engine 326 may determine that two datasets should be graphed within a single graph area and using a single common vertical axis (e.g., an axis that spans the domain between the minimum and maximum values of the two datasets). In another example, the charting decision engine 326 may determine that two datasets should be graphed within a single chart area, but using independent linearly scaled vertical axes for each dataset, such that the two datasets may overlay one another even if their respective values are in separate domains. In another example, the charting decision engine 326 may scale the values in each aligned time-series dataset relative to the maximum value of each. For metrics that are always positive, such as bandwidth, utilization, speed, etc., this results in a set of values between 0 and 1 (i.e., between zero and the maximum value), which may then be plotted on a common vertical axis regardless of the absolute values of the datasets. In still other examples, the charting decision engine 326 may determine that one dataset should be graphed using a logarithmic scale while another should be graphed using a linear scale.

The determination of which scaling to use for graphing particular datasets may be based on multiple factors so as to render a visual representation of the datasets that facilitates understanding and analysis by the user 332. Among other factors, the charting decision engine 326 may base such decisions on the domains of the datasets graphed (i.e., the minimum and maximum values), the degree of similarity between the datasets, and/or the distribution of values within each dataset.

The user interface 328 may include components for providing information to the user 332, such as a display, an audio speaker, a haptic feedback system, and/or another system that outputs perceptible signals to the user 332. The user interface 328 may also include components for receiving inputs from the user 332, such as a microphone, a camera, a keyboard, a touch-sensitive panel, buttons, levers, etc. For instance, the user interface 328 may include a touch-sensitive display that displays information related to: (1) the origin of the received aligned time-series datasets 318, (2) the degree of dependence among at least some pairs of those datasets (e.g., as determined by the comparison evaluator 324), and (3) a chart with at least some of the datasets graphed over time (e.g., according to the scaling determined by the charting decision engine 326). In addition, such a touch-sensitive display may include regions indicated by suitable fields on the display for the user 332 to manipulate the information rendered. For example, the user interface 328 may allow the user 332 to modify lists of available datasets (e.g., to filter and/or sort available datasets by time, origin, name, etc.), to manually select which datasets to chart and/or which datasets to evaluate for comparison, and/or to manually select a type of chart and/or scaling with which the datasets are presented (e.g., to over-ride the automatic determination of the charting decision engine 326). Of course, many other examples of input devices used for the user 332 to provide such information to the visualization system 320 are possible.

Data storage 330 may include volatile and/or non-volatile memory and can store executable machine-readable instructions that, when executed by a processing system of the visualization system 320, cause the modules noted above (e.g., 324, 326, 328) to perform the functions described herein. That is, some of the functions described herein in relation to the comparison evaluator 324, the charting decision engine 326, and/or the user interface 328 may involve software-implemented functions that are stored as machine-readable instructions on data storage 330. Moreover, some or all of the machine-readable instructions used in implementing functions of the visualization system 320 may be stored at a remote server that receives calls for providing certain functionality and returning results.

Figure 4:
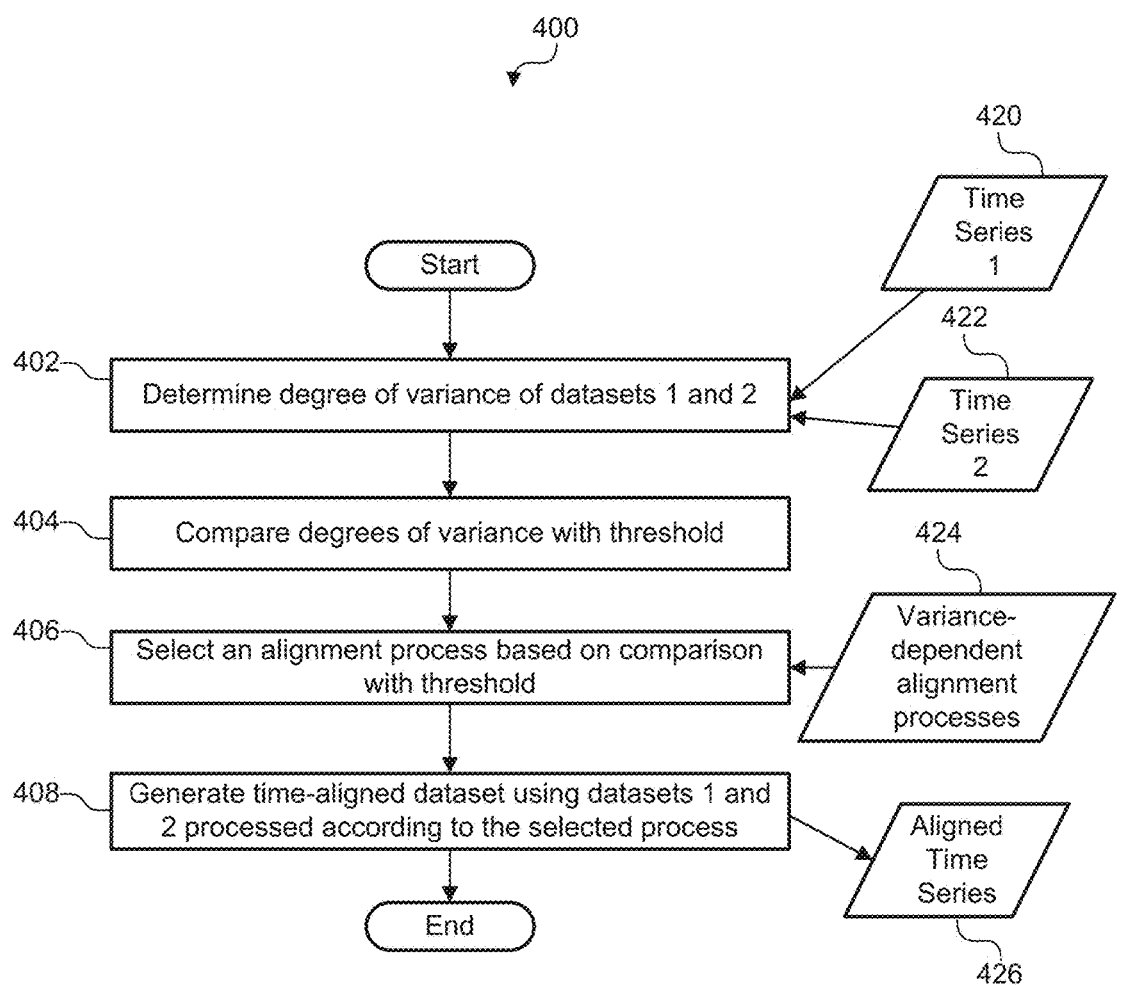
FIG. 4 is a flowchart of an example process for aligning time-series datasets.

FIG. 4 is a flowchart of an example process 400 for aligning time-series datasets. The process 400 may be performed by the dataset alignment system 110 described above in connection with FIGS. 1 and 3. By way of example, the flowchart of process 400 is described with reference to system 110.

At block 402, the degree of variance of a first dataset 420 and a second dataset 422 can be determined. For example, the variance evaluator 114 can determine the degree of variance of the two datasets 420, 422. In some examples, the variance evaluator 114 may compute an autocorrelation of the first dataset 420, and also compute an autocorrelation of the second dataset 422.

The system may receive time-series datasets 420, 422. For example, the dataset alignment system 110 could receive the datasets 420, 422 via the communication interface 112. In some cases, the datasets 420, 422 may be provided to the dataset alignment system 110 by another subsystem or process. For example, the datasets 420, 422 could be loaded, transferred, created, updated, read, stored, and/or maintained by a variety of systems such that the datasets 420, 422 become available for analysis by the system 110. The two datasets 420, 422 may include a set of values each associated with a respective time stamp, and each value may be indicative of measurements and/or metrics obtained at the sequence of times indicated by the time stamps. At least a portion of the two datasets 420, 422 span an overlapping time interval. For instance, the time stamps of the first time-series dataset 420 may span a first time interval, and the time stamps of the second time-series dataset 422 may span a second time interval which at least partially overlaps the first time interval. The portion of the datasets 420, 422 from the overlapping time interval is used to generate a dataset with time-aligned values (e.g., pairs of values associated with a common time stamp or time stamps within a temporal tolerance of one another). The remaining description of the process 400 assumes that the two datasets are from an overlapping interval (i.e., approximately equal earliest and latest time stamps), although it is understood that one or both of the two datasets 420, 422 may require truncation to achieve these conditions. In some examples, the overlapping time interval can be defined as the time spanned from the later one of the earliest time stamps in datasets 420, 422 to the earlier one of the latest time stamps in datasets 420, 422.

As discussed above, the two datasets 420, 422 may not be aligned in time (i.e., the sequence of time stamps of each will not be identical). The two datasets may have different measurement intervals. For example, the first dataset 420 may have values spaced by about 0.5 seconds and the second dataset 422 may have values spaced by about 0.8 seconds. In some examples, the two datasets 420, 422 may have a measurement offset with respect to one another. For example, the datasets may have the same time spacing of about 0.5 seconds, but the first dataset 420 may begin at time 0, and the second dataset 420 may begin at time 0.2 seconds, such that each time stamp in dataset 422 is about 0.2 seconds later than the nearest one in dataset 420. In some examples, one or both of the datasets 420, 422 may not have periodic time stamps, such that values are obtained at regular time intervals. Further still, one or both of the datasets 420, 422 may have missing points, such as due to a communication disruption, a faulty sensor, a value out of range, or another state resulting in a non-value (e.g., NAN) becoming associated with some time stamps.

At block 404, the degrees of variance can be compared with a threshold. The comparison with the threshold may result in each of the two datasets 420, 422 being characterized as either smooth or not smooth. As described above, in an example in which the degree of variance determined in block 402 is an autocorrelation, the threshold may be about 0.8 with greater values indicating smooth datasets and lesser values indicating not smooth (noisy) datasets.

At block 406, one of a group of multiple time alignment processes 424 can be selected based on the comparison with the threshold. For instance, based on the comparison, the process selector 116 may determine whether the two datasets 420, 422 are in one of three possible states, either: (1) both smooth; (2) both noisy; or (3) one smooth and one noisy. The process selector 116 may then select among three predetermined time alignment processes that each correspond to a respective one of the three possible smoothness states. The process selector 116 could then select one of the three states based on a correspondence between the process and the determined smoothness state.

At block 408, an aligned time-series dataset 426 can be generated using the two datasets 420, 422 processed according to the selected one of the variance-dependent alignment processes 424. For example, the aligned time-series dataset 426 may be generated using the time-series aligner 118. In some examples, time alignment processes may involve interpolating between values in a smooth dataset based on time stamps in the other dataset to thereby generate a set of paired values. In some examples, time alignment processes may involve selecting pairs of values in two noisy datasets having associated time stamps within a temporal tolerance of one another to thereby generate a set of paired values. Examples in which time alignment processes are applied to example datasets with different degrees of variance are described below in connection with FIGS. 6A-6C.

The aligned time-series dataset 426 may include a set of paired values and each pair can be associated with a common time stamp or with time stamps that are similar. For example, some pairs of values may be associated with a single common time stamp. Some pairs of values may be associated with a pair of identical time stamps. The values in a given pair may be associated with respective time stamps that differ by less than a temporal tolerance. Data structures used to realize associations between values and their time stamps could take a variety of different forms. For instance, the aligned time-series dataset 426 may be implemented as two separate dataset arrays, and each array can include two columns to associate values, in one column, with time stamps, in the other column. Regardless of the data structure selected, the aligned time-series dataset 426 provides two sets of values: one corresponding to the first time-series dataset 420, and the other corresponding to the second time-series dataset 422. Moreover, the two sets of values have a one-to-one correspondence with one another based on common or similar time stamps. That is, each value in the first set corresponds to a single value in the second set and both are associated with an identical or similar time stamp and vice versa.

Figure 5A:
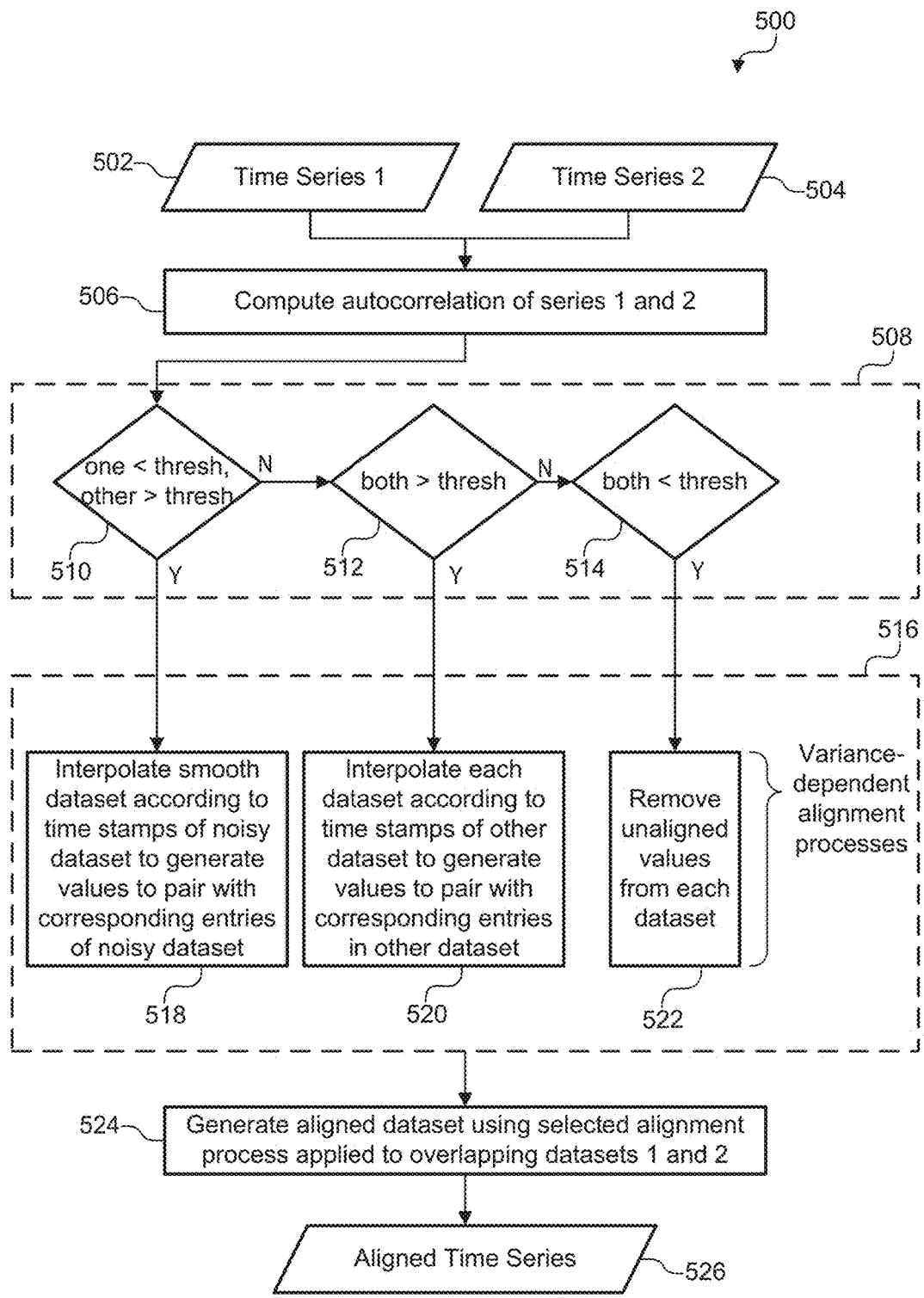
FIG. 5A is a flowchart of an example time alignment process.

FIG. 5A is a flowchart of an example time alignment process 500. As in the discussion of FIG. 4, the process 500 is described in connection with the dataset alignment system 110 for example purposes. As illustrated in FIG. 5A, the process 500 begins by receiving two time-series datasets 502, 504 as inputs.

At block 506, the autocorrelation values of each time-series datasets 502, 504 can be computed (e.g., by the variance evaluator 114). In some examples, the autocorrelation is determined by first generating, for each of the datasets 502, 504, two sets of values, one delayed with respect to the other by one sample point. For example, for dataset X with values X[i], i=1 . . . n, the autocorrelation of X can be computed from A=$X_1, \ldots, X_{n-1}$ and B=$X_2, \ldots, X_n$;

$$r_{AB} = \frac{\text{cov}(A, B)}{\sigma_A \sigma_B} = \frac{\sum_{i=1}^{n-1}(A_i - \overline{A})(B_i - \overline{B})}{\sqrt{\sum_{i=1}^{n-1}(A_i - \overline{A})^2}\sqrt{\sum_{i=1}^{n-1}(B_i - \overline{B})^2}},$$

with $\overline{A}$ and $\overline{B}$ equal to the mean value of A and B, respectively.

At block 508, the autocorrelations can be used as a basis to select from among multiple time alignment processes 516. For example, the process selector 116 can compare the autocorrelations with a threshold, and determine whether: (1) one autocorrelation is above the threshold and the other is below (510); (2) the two autocorrelations are both greater than the threshold (512); or (3) the two autocorrelations are both less than the threshold (514). Because the autocorrelation is greater for data which is smoother, as illustrated by the example datasets shown in FIGS. 2A and 2B, comparing the autocorrelations with the threshold can be used to characterize the datasets as either smooth or noisy. For instance, if block 510 is true (one above the threshold, the other below), then one dataset may be considered smooth and the other not smooth. If block 512 is true (both above the threshold), then both datasets may be considered smooth. If block 514 is true (both below the threshold), then both datasets may be considered not smooth.

Each of the three states 510, 512, 514 correspond to one of the variance-dependent alignment processes 516. As shown in FIG. 5A, one autocorrelation above the threshold and the other below (510) corresponds to a first process 518; both being greater than the threshold (512) corresponds to a second process 520; and both less than the threshold (514) corresponds to a third process 522. Depending on which of the blocks 510, 512, 514 is true, a respective one of the multiple alignment processes 518, 520, 522 can be selected (e.g., by the process selector 118).

The first process 518 may correspond to a smoothness state in which one dataset is smooth, and the other is noisy. The first process 518 can involve interpolating between values of the smooth dataset according to time stamps of the noisy dataset to generate paired values at each time stamp of the noisy dataset. For example, if the first dataset 502 is smooth and the second dataset 504 is noisy, values of the first dataset 502 near a given time stamp of the second dataset 504 can be interpolated at the given time stamp to generate an interpolated value that can be paired with the value of the second dataset 504 associated with the same time stamp. An example of performing the first process 518 is described in connection with FIG. 6A.

The second process 520 may correspond to a smoothness state in which both datasets are smooth. The second process 518 can involve interpolating each dataset according to time stamps of the other dataset to generate paired values at each time stamp. For example, values of the first dataset 502 having time stamps near a time stamp of the second dataset 504 can be interpolated to generate an interpolated value that can be paired with the value of the second dataset 504 associated with the same time stamp. Similarly, values of the second dataset 504 having time stamps near a time stamp of the first dataset 502 can be interpolated to generate an interpolated value that can be paired with the value of the first dataset 502 associated with the same time stamp. An example of performing the first process 518 is described in connection with FIG. 6B.

The third process 522 may correspond to a smoothness state in which both datasets are noisy. The third process 522 can involve removing unaligned values from each dataset. For example, a temporal tolerance can be determined based on spacings between consecutive time stamps in the two datasets 502, 504. Values from the two datasets that are within the temporal tolerance of one another can be identified and paired for inclusion in the aligned dataset, while the remaining values can be removed. Determining the temporal tolerance may involve computing a representative time spacing between consecutive time stamps in the first dataset 502 such as a median spacing, mean spacing, minimum spacing, maximum spacing, etc. A representative time spacing between consecutive time stamps in the second dataset 404 such as a median spacing, mean spacing, minimum spacing, maximum spacing, etc, may also be computed. The temporal tolerance may then be determined based on the two representative time spacings. In some cases, the temporal tolerance may be 20% of the lesser of the median time spacings of the two datasets 502, 504. However, other temporal tolerance values may be arrived by using a different fraction of the lesser median (e.g., between about 10% and about 50%) and/or by selecting another manner of computing the representative time spacing such as a mean time spacing. Moreover, in some examples, the temporal tolerance may be based on individual ones of the time spacings between consecutive time stamps in one or both datasets rather than a single representative time spacing. For instance, the temporal tolerance may be based on a population distribution of the time spacings in one or both datasets. In some cases, the temporal tolerance may be equal to some fraction of a time spacing in a particular percentile of the distribution. Upon determining the temporal tolerance, the two datasets can be analyzed to identify pairs of time stamps, with one in each dataset, that are within the temporal tolerance of one another. The values of each dataset associated with those time stamps can be identified as a pair for inclusion in the aligned dataset. An example of performing the third process 522 is described in connection with FIG. 6C.

Figure 5B:
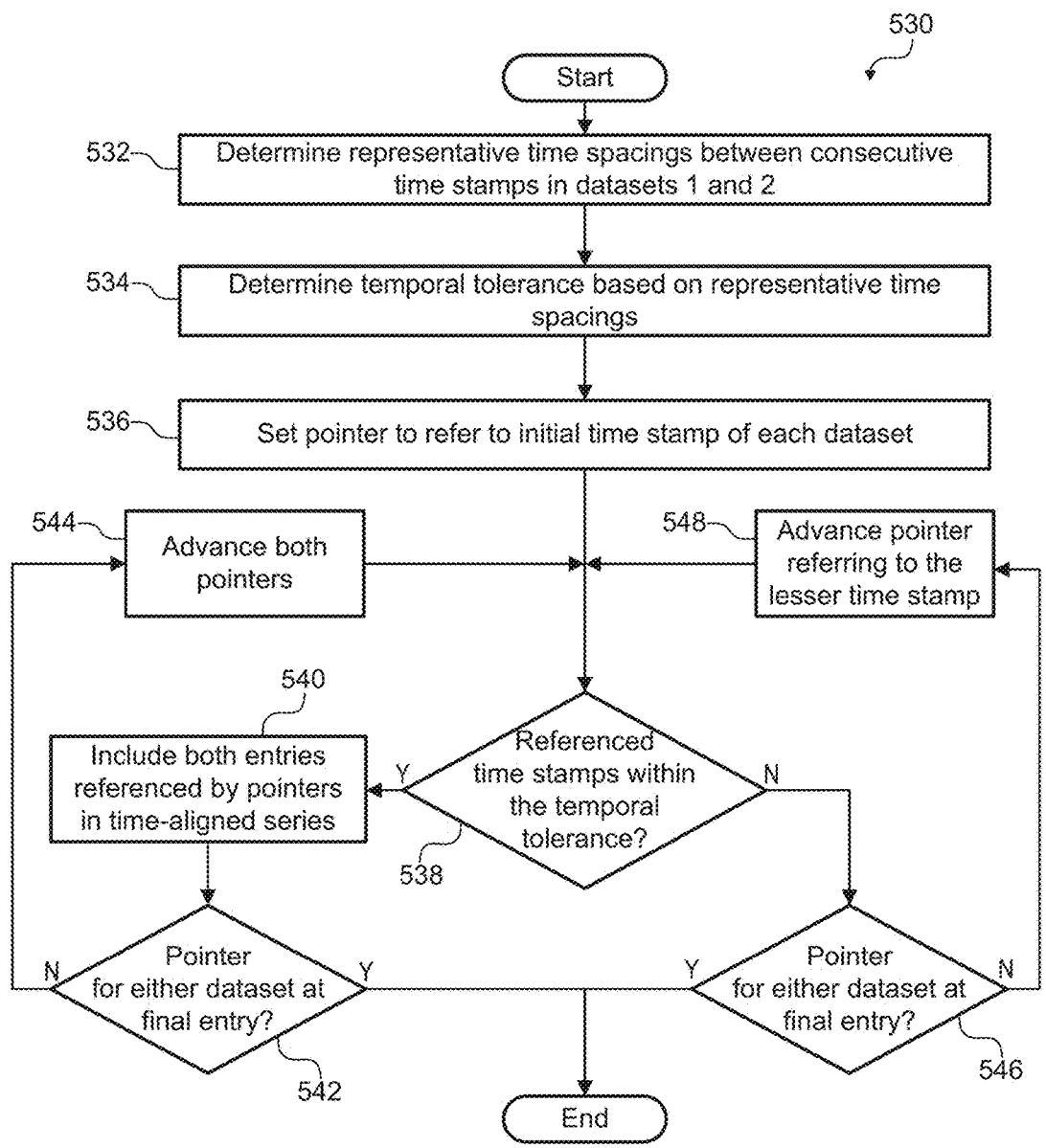
FIG. 5B is a flowchart of an example time alignment process.

FIG. 5B is a flowchart of an example process 530 for generating an aligned dataset from two noisy datasets (e.g., as in the third process 522). At block 532, representative time spacings between consecutive time stamps in two datasets are determined. For example, the representative time spacings may be median values between consecutive time stamps in the respective datasets. At block 534, a temporal tolerance is determined based on the representative time spacings. For example, the temporal tolerance may be about 20% of the lesser one of the two median values.

At block 536, a pair of pointers are set to refer to the initial time stamp of each dataset. That is, for two datasets A and B, with respective values A[i] and B[i] and associated time stamps $T_A[i]$ and $T_B[i]$, i=1, . . . n, a first pointer $P_A$ can be set to refer to $T_A[1]$ and a second pointer $P_B$ can be set to refer to $T_B[1]$. In some cases, the pointers may be index values for the time stamps and both may be initialized to 1 (e.g., initially, $T_A[P_A]=T_A[1]$). The pointers $P_A$ and $P_B$ can be used to examine the time stamps in the datasets and compare their values with one another to identify pairs that are within the temporal tolerance of one another. At block 538, the process 530 proceeds by determining whether the time stamps referenced by the pointers are within the temporal tolerance $t_{TOL}$. The determination at block 538 may evaluate the difference between the time stamps and determine whether the difference is less than $t_{TOL}$. If the time stamps are within $t_{TOL}$, both entries currently referred to by the pointers $P_A$ and $P_B$ are included in the aligned time-series series, at block 540. Following block 540, block 542 proceeds by determining whether either pointer is at the final entry of its respective dataset (i.e., whether $P_A=n_A$ or $P_B=n_B$, with $n_A$ and $n_B$ equal to the number of entries in each dataset). If either pointer is at the final entry of its dataset, the process 530 ends, but if not, both pointers are advanced to their next value, at block 544, and the then-referenced time stamps are evaluated at block 538. If, at block 538, the referenced time stamps are not within $t_{TOL}$, then block 546 proceeds by determining whether either pointer is at the final entry of its dataset (similar to block 542). If either pointer is at the final entry of its dataset, the process 530 ends, but if not, the pointer referring to the lesser time stamp is advanced, at block 548, and the then-referenced time stamps are evaluated at block 538. The result of the process 530 is to systematically step through the two datasets and identify all non-redundant pairs of entries in the two datasets that are within the temporal tolerance of one another, and include those entries in the aligned time-series dataset.

Referring again to FIG. 5A, at block 524, the selected process (i.e., one of the processes 516) and the two datasets 502, 504 are used to generate an aligned dataset 526. For example, the time-series aligner 118 may process the datasets 502, 504 according to a selected one of the processes 516 to generate the aligned dataset 526.

Figure 6A:
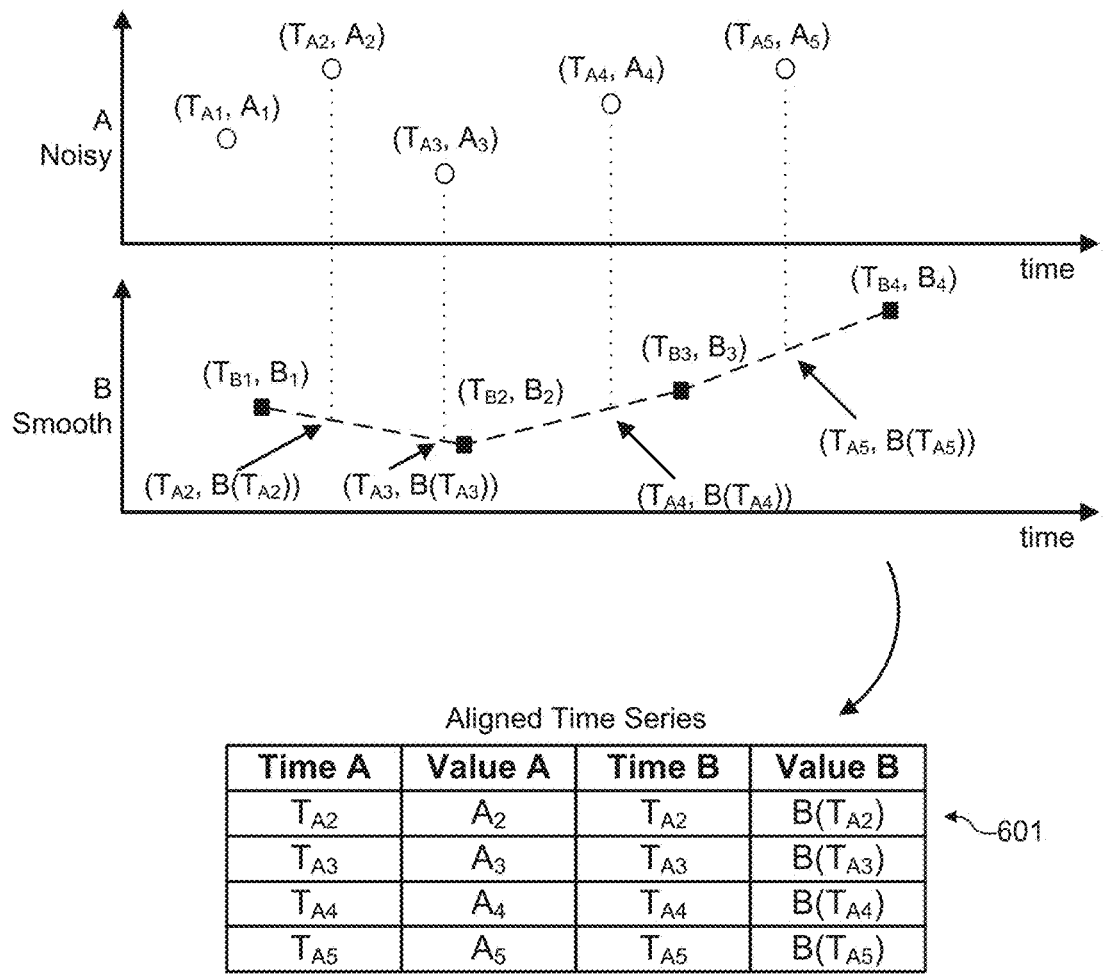
FIG. 6A illustrates an example time alignment process for generating an aligned time-series dataset.

FIG. 6A illustrates an example time alignment process for generating an aligned time-series dataset 601. In particular, FIG. 6A graphically illustrates two example datasets A and B with graphs of value versus time. Thus, each entry in the dataset is charted at a single point on the respective graphs. For each entry, the value of that entry defines its position along the vertical axis and the time stamp of that entry defines its position along the horizontal axis. Each of the entries in dataset A are represented by circles with values $A_1$, $A_2$, $A_3$, $A_4$, $A_5$ at respective time points $T_{A1}$, $T_{A2}$, $T_{A3}$, $T_{A4}$, $T_{A5}$. Similarly, each of the entries in dataset are represented by filled squares with values $B_1$, $B_2$, $B_3$, $B_4$ at respective time points $T_{B1}$, $T_{B2}$, $T_{B3}$, $T_{B4}$. Dataset A includes entries $\{(T_{A1}, A_1), (T_{A2}, A_2), (T_{A3}, A_3), (T_{A4}, A_4), (T_{A5}, A_5)\}$, and dataset B includes entries $\{(T_{B1}, B_1), (T_{B2}, B_2), (T_{B3}, B_3), (T_{B4}, B_4)\}$.

Dataset A may be considered not smooth (i.e., noisy) and dataset B may be considered smooth. For example, autocorrelations (or other degrees of variance) may be calculated for each dataset and compared with a threshold (e.g., by the variance evaluator 114). Based on the comparison with the threshold, dataset A may be considered noisy and dataset B may be considered smooth. Upon characterizing the smoothness of the two datasets, a time alignment process can be selected (e.g., by the process selector 116). The selected process may be one in which the smooth dataset (dataset B) is interpolated at time stamps of the noisy dataset (dataset A) to generate paired entries for the aligned time-series 601.

As illustrated by FIG. 6A, the selected interpolation process can involve determining an interpolation path between entries of the smooth dataset (i.e., dataset B). The interpolation is illustrated by the dashed path (e.g., the line connecting the first two points $(T_{B1}, B_1)$ to $(T_{B2}, B_2)$). Values along that path can then be evaluated at the time stamps of the entries in dataset A that are within the time spanned by the interpolation. That is, interpolated values may be generated for all time stamps in dataset A that are both greater than $T_{B1}$ and less than $T_{B2}$, which includes $T_{A2}$ and $T_{A3}$. As such, for a smooth and noisy dataset such as datasets A and B, the beginning of the overlapping time interval can be the later one of the earliest time stamps from datasets A and B. The end of the overlapping time interval can be the earlier one of the latest time stamps from datasets A and B. In particular, note that the first entry in dataset A with time stamp $T_{A1}$ is not included because it is outside the time range of the interpolation path for the first two points of dataset B. In some examples, the interpolation path may be extended beyond $T_{B1}$ to also generate an interpolated value at time $T_{A1}$, which could be paired with value $A_1$. In some examples, as shown in FIG. 6A, the first entry of dataset A may be ignored and not included in the aligned time-series 601.

The interpolated values along the path are represented in the graphs and table of FIG. 6A as $B(T_{A2})$ and $B(T_{A3})$, which are the values of the determined path evaluated at the $T_{A1}$ and $T_{A2}$, respectively. The vertical lines connecting points of dataset A (e.g., $(T_{A2}, A_2)$) to the interpolation path of dataset B (e.g., the dashed path between points $(T_{B1}, B_1)$ and $(T_{B2}, B_2)$) represent the evaluation of the interpolation path at the time stamps of dataset A. The interpolated values can then be paired with the associated entries of dataset A and included in the aligned time-series 601. Thus, in the aligned dataset 601, the values $A_2$ and $B(T_{A2})$ are paired with one another and both are associated with the same time stamp, $T_{A2}$. In addition, the values $A_3$ and $B(T_{A3})$ are paired with one another and both are associated with the same time stamp, $T_{A3}$. Similarly, the interpolated value $B(T_{A4})$ may be based on an interpolation between the points $(T_{B2}, B_2)$ and $(T_{B3}, B_3)$ evaluated at time stamp $T_{A4}$. And the interpolated value $B(T_{A5})$ may be based on an interpolation between the points $(T_{B3}, B_3)$ and $(T_{B4}, B_4)$ evaluated at time stamp $T_{A5}$.

In some examples, the interpolation path between entries in the smooth dataset may be a line defined by time-adjacent points of the smooth dataset. In other examples, the interpolation path may be a higher-order polynomial, such as a spline function or the like. For a linear interpolation between adjacent points, the interpolated values can be defined as follows:

$$B(t) = B_1 + (t - T_{B1})\left(\frac{B_2 - B_1}{T_{B2} - T_{B1}}\right), \text{ for } T_{B1} < t < T_{B2}$$

$$B(t) = B_2 + (t - T_{B2})\left(\frac{B_3 - B_2}{T_{B3} - T_{B2}}\right), \text{ for } T_{B2} < t < T_{B3}$$

$$B(t) = B_3 + (t - T_{B3})\left(\frac{B_4 - B_3}{T_{B4} - T_{B3}}\right), \text{ for } T_{B3} < t < T_{B4}$$

Thus, for a linear interpolation:

$$B(T_{A2}) = B_1 + (T_{A2} - T_{B1})\left(\frac{B_2 - B_1}{T_{B2} - T_{B1}}\right)$$

-continued $$B(T_{A3}) = B_1 + (T_{A3} - T_{B1})\left(\frac{B_2 - B_1}{T_{B2} - T_{B1}}\right)$$

$$B(T_{A4}) = B_2 + (T_{A4} - T_{B2})\left(\frac{B_3 - B_2}{T_{B3} - T_{B2}}\right)$$

$$B(T_{A5}) = B_3 + (T_{A5} - T_{B3})\left(\frac{B_4 - B_3}{T_{B4} - T_{B3}}\right)$$

Each of the interpolated values $B(T_{A2})$, $B(T_{A3})$, $B(T_{A4})$, and $B(T_{A5})$ can be paired with the value of dataset A associated with its respective time stamp: $A_2$, $A_5$, $A_4$, $A_5$, respectively. The four paired values can also be associated with their time stamps: $T_{A2}$, $T_{A3}$, $T_{A4}$, $T_{A5}$ and can then be included in the aligned time-series 601.

With reference to FIG. 4A, the first alignment process 418 selected when two datasets include one smooth and one noisy (410) can be performed in accordance with the example illustrated in FIG. 6A. As described above, the smooth dataset can be interpolated at time points of the noisy dataset and the interpolated values can be paired with the values of the noisy dataset that are associated with the same time stamp to generate an aligned time-series.

Figure 6B:
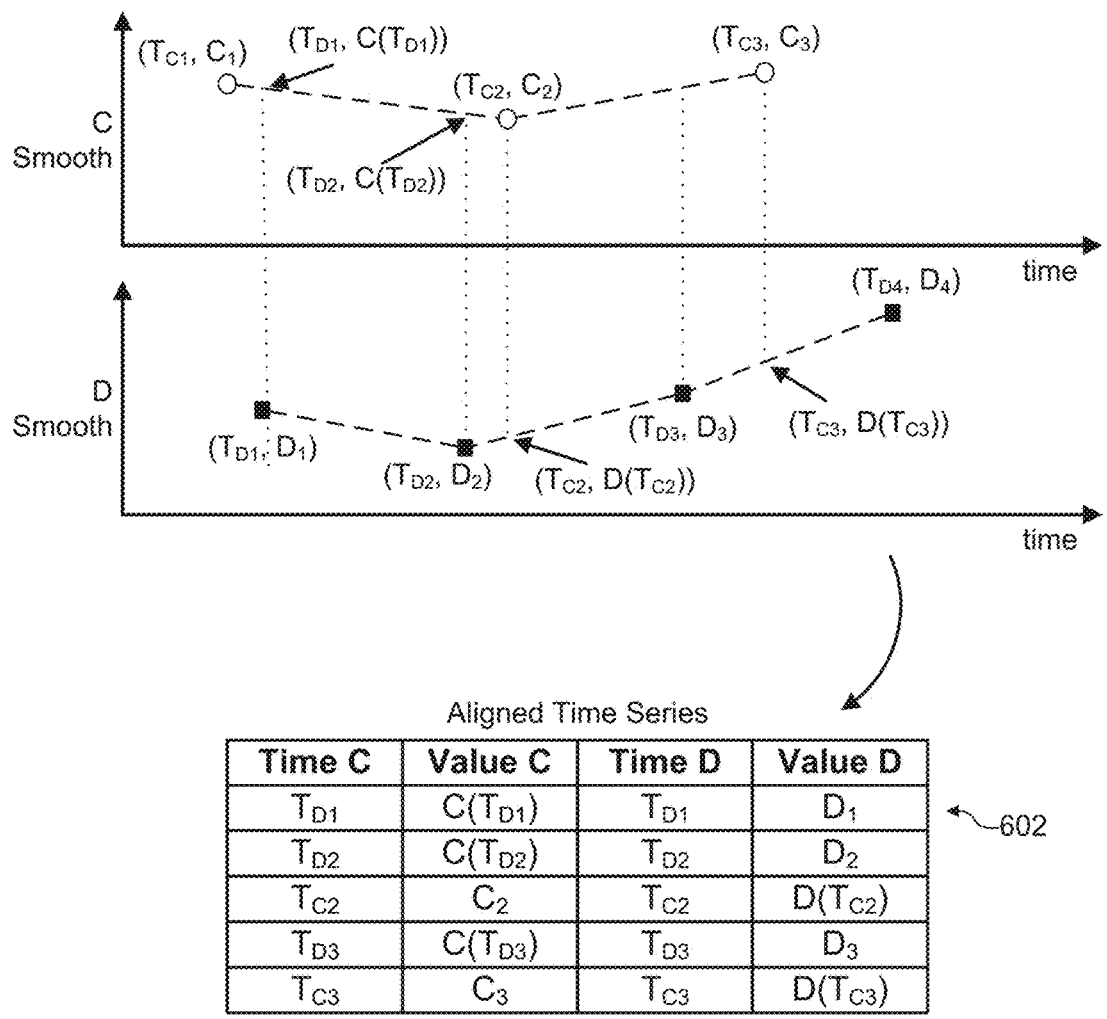
FIG. 6B illustrates an example time alignment process for generating an aligned time-series dataset.

FIG. 6B illustrates an example time alignment process for generating an aligned time-series dataset 602. In particular, FIG. 6B graphically illustrates two example datasets C and D charted similarly to the datasets A and B in FIG. 6A. However, the two example datasets C and D can both be considered smooth (e.g., as determined by a comparison of the respective degrees of variance of datasets C and D with a threshold). A time alignment process suitable for processing two smooth datasets can be selected (e.g., by the process selector 116). The selected process may be one in which both smooth datasets are interpolated at time stamps of the other dataset to generate paired entries for the aligned time-series 602.

As illustrated by FIG. 6B, the selected interpolation process can involve determining an interpolation path between entries of both datasets. The interpolation is illustrated by the dashed paths connecting the points of each dataset. Interpolated values along that path can then be evaluated at the time stamps of the other dataset to generate paired values. As in the interpolation process described in connection with FIG. 6A, the interpolation path may be a linear interpolation or a higher-order interpolation. The process may identify all points in dataset C that have time stamps within a time range of interpolation path(s) for dataset D, which includes times $T_{C2}$ and $T_{C3}$. The process may also identify all points in dataset D that have time stamps within a time range of interpolation path(s) for dataset C, which includes $T_{D1}$, $T_{D2}$, and $T_{D3}$. Pairs of values can be determined or each of the five time stamps, with each pair including one interpolated value (e.g., one of $C(T_{D1})$, $C(T_{D2})$, $D(T_{C2})$, $C(T_{D3})$, or $D(T_{C3})$) and one non-interpolated value (e.g., one of $D_1$, $D_2$, $C_2$, $D_3$, and $C_3$). The set of paired values each associated with one of the identified time stamps are included in the aligned time-series 602, as shown in FIG. 6B.

In some cases, the interpolation paths may be defined between points of each dataset, but not projected beyond earliest (or latest) point in the datasets. As such, interpolated values may be generated for time stamps that are within a time range for which an interpolation path is defined. As shown in FIG. 6B, the first entry of dataset C, $(T_{C1}, C_1)$, and the last entry of dataset D, $(T_{D4}, D_4)$, are outside the time ranges spanned by the interpolations of the other dataset. Therefore, those points are not included in the aligned time-series 602, because interpolated values are not defined to pair with each of those entries. However, in some examples, interpolation paths may be defined to extend beyond earliest and/or latest time stamps and interpolated values for pairing may be generated in those time ranges.

With reference to FIG. 4A, the second alignment process 420 selected when two datasets are both smooth (410) can be performed in accordance with the example illustrated in FIG. 6B. As described above, the smooth datasets can each be interpolated at time points of the other dataset and the interpolated values can be paired with the values of the other dataset that are associated with the same time stamp to generate an aligned time-series.

Figure 6C:
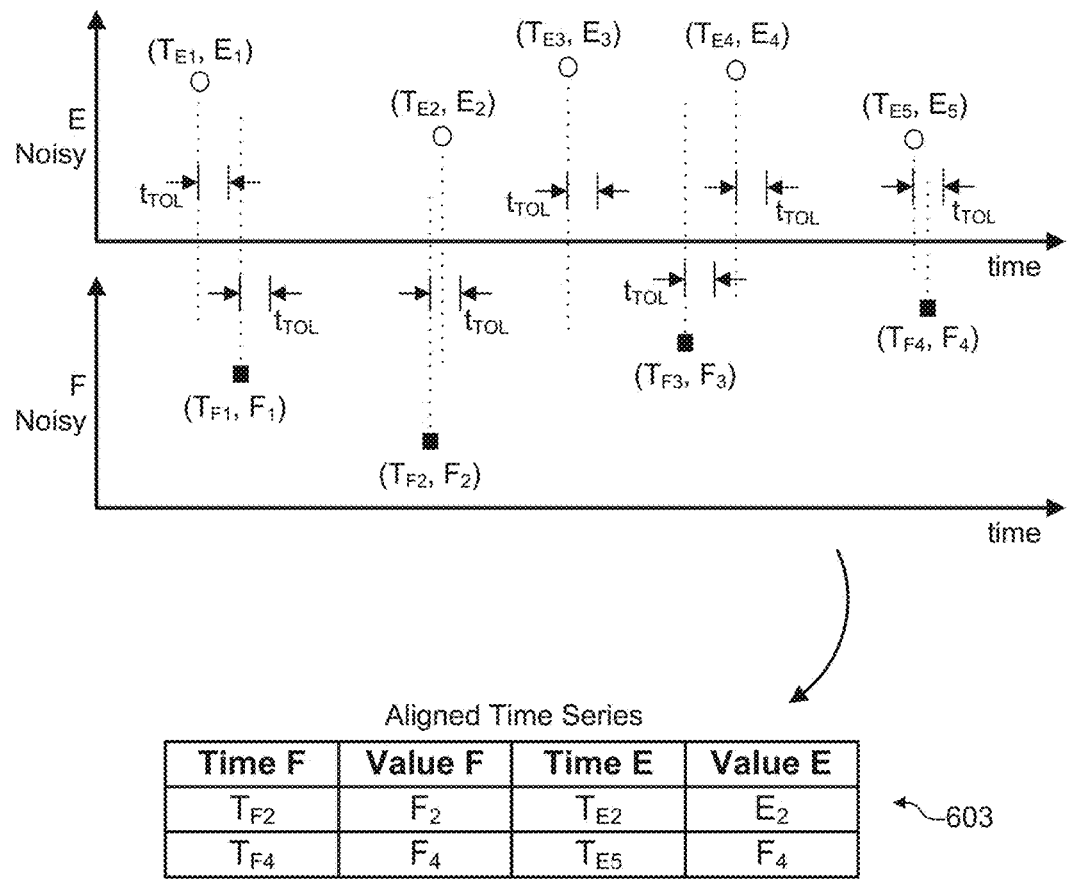

FIG. 6C illustrates an example time alignment process for generating an aligned time-series dataset 603. In particular, FIG. 6C graphically illustrates two example datasets E and F charted similarly to the datasets A and B in FIG. 6A. However, the two example datasets E and F can both be considered noisy (e.g., as determined by a comparison of the respective degrees of variance of datasets E and F with a threshold). A time alignment process suitable for processing two noisy datasets can be selected (e.g., by the process selector 116). The selected process may be one in which both the noisy datasets are filtered to identify those pairs of time stamps (one from each dataset) that are within a temporal tolerance of one another. The entries for each identified pair can then be included in the aligned time-series 603, and the remaining entries can be ignored.

As illustrated by FIG. 6C, the selected interpolation process may involve first determining a temporal tolerance $t_{TOL}$. Some techniques for determining $t_{TOL}$ are described in connection with FIGS. 4A and 4B above. For example, $t_{TOL}$ may be about 20% of the lesser of the median time spacing between consecutive time stamps in dataset E and the median time spacing between consecutive time stamps in dataset F. After determining $t_{TOL}$, the set of pairs of time stamps from both datasets (i.e., one in dataset E and one in dataset F) that are within the temporal tolerance can be identified using the process 430 described in connection with FIG. 4B. For example, the time stamps of the first entries in each dataset can be evaluated to determine whether they are within $t_{TOL}$ (e.g., via pointers initialized to refer to the first entries of datasets E and F, respectively). Because $T_{F1}-T_{E1} > t_{TOL}$ (as illustrated in FIG. 6C), the pointer referring to the lesser time (i.e., $T_{E1}$) can be advanced, such that the two pointers now refer to $T_{F1}$ and $T_{E2}$. But $T_{E2}-T_{F1} > t_{TOL}$ as well, and so the pointer referring to the lesser time ($T_{F1}$) is advanced. The pair of entries ($T_{E2}$, $E_2$) and ($T_{F2}$, $F_2$) are included in the aligned time-series 603 because $T_{E2}-T_{F2} < t_{TOL}$, and the pointers are both advanced. The next three comparisons with $t_{TOL}$ all fail (i.e., $T_{F3}-T_{E3} > t_{TOL}$; $T_{E4}-T_{F3} > t_{TOL}$; and $T_{F4}-T_{E4} > t_{TOL}$), and so the entries associated with those time stamps are not included as pairs in the aligned time-series. The final pair of entries is included in the aligned time-series 603 because $T_{F4}-T_{E5} < t_{TOL}$, as shown in FIG. 6C.

With reference to FIG. 4A, the third alignment process 422 selected when both datasets are noisy (412) can be performed in accordance with the example illustrated in FIG. 6C. As described above, a temporal tolerance can be determined and the noisy datasets can be filtered to identify pairs of time stamps that are within the temporal tolerance of one another and those entries can be included in an aligned time-series.

Figure 7:
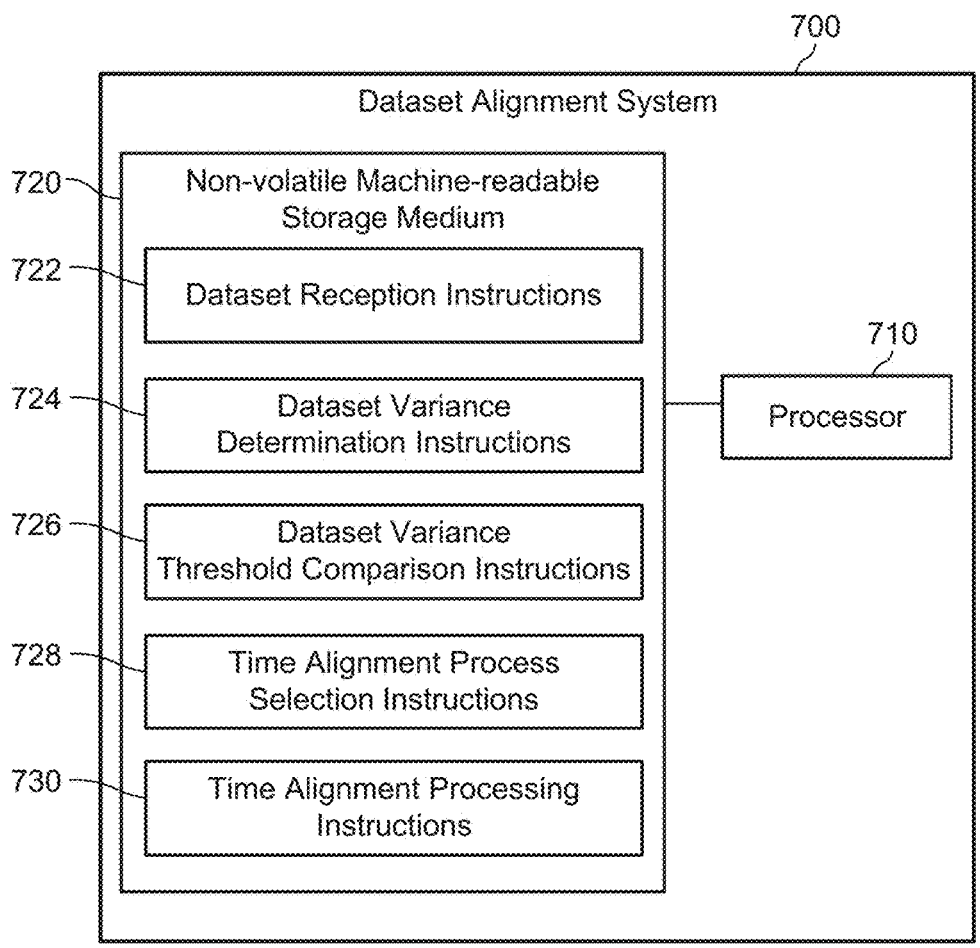
FIG. 7 is a block diagram of an example system for aligning time-series datasets.

FIG. 7 is a block diagram of an example system 700 for aligning time-series datasets. System 700 may be similar to system 110 described in connection with FIGS. 1 and 3, for example. In FIG. 7, system 700 includes a processor 710 and a non-transitory machine-readable storage medium 720. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 710 may incorporate central processing units (CPUs), microprocessors, and/or other hardware devices suitable for retrieval and execution of instructions stored in non-transitory machine-readable storage medium 720. In the particular example shown in FIG. 7, processor 710 may fetch, decode, and execute instructions 722, 724, 726, 728, 730. In some examples, processor 710 may include electronic circuits having electronic components for performing the processes specified by the instructions in machine-readable storage medium 720. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. In some examples, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions for receiving two time-series datasets, determining a degree of variance of each, selecting a time alignment process based on the degrees of variance, and generating an aligned time-series dataset by processing the received datasets according to the selected process.

Referring to FIG. 7, dataset reception instructions 722, when executed by a processor (e.g., 710), may cause system 700 to receive (and/or send) time-series datasets via a communication network. Dataset variance determination instructions 724, when executed by a processor (e.g., 710), may cause system 700 to determine a degree of variance of two time-series datasets (e.g., by computing an autocorrelation of each). Dataset variance threshold comparison instructions 726, when executed by a processor (e.g., 710), may cause system 700 to compare the degrees of variance with a threshold (e.g., so as to indicate whether the datasets are smooth or noisy). Time alignment process selection instructions 728, when executed by a processor (e.g., 710), may cause system 700 to select one of a set of multiple time alignment processes based on the comparisons between the determined degrees of variance and the threshold. Time alignment processing instructions 730, when executed by a processor (e.g., 710), may cause system 700 to generate an aligned time-series dataset by processing the received time-series datasets in accordance with the selected time alignment process.

The invention claimed is:

1. A method comprising:
    determining a first degree of variance of a first set of values and a second degree of variance of a second set of values, wherein the first set of values is included in a first time-series dataset in which the values are associated with respective time stamps, and the second set of values is included in a second time-series dataset in which the values are associated with respective time stamps;
    comparing the determined first degree of variance of the first set of values to a threshold and characterizing the first set of values based on the comparison;
    comparing the second degree of variance of the second set of values to the threshold and characterizing the second set of values based on the comparison;
    selecting a time alignment process among multiple time alignment processes based on the characterizations of the first set of values and the second set of values; and
    processing the first and second time-series datasets according to the selected time alignment process to thereby generate an aligned time-series dataset comprising a set of paired values.

2. The method of claim 1, further comprising:
    making a smoothness determination, based on the comparisons, that each of the first and second datasets is either smooth or not smooth, wherein the multiple time alignment processes comprise: (i) a first process corresponding to both the first and second datasets being smooth; (ii) a second process corresponding to one of the first and second datasets being smooth and the other being not smooth; and (iii) a third process corresponding to both the first and second datasets being not smooth; and
    wherein selecting among the multiple time alignment processes comprises selecting among the first, second, or third processes based on a correspondence between the selected process and the smoothness determination.

3. The method of claim 1, wherein the time stamps of the first time-series dataset span a first interval and the time stamps of the second time-series dataset span a second interval that at least partially overlaps the first interval during an overlapping interval, and wherein the paired values of the aligned time-series dataset are associated with respective time stamps that span at least part of the overlapping interval.

4. The method of claim 1, wherein selecting among the time alignment processes comprises:
    determining, based on the comparison of the first degree of variance and the threshold, that the first time-series dataset is smooth; and
    responsive to determining that the first time-series dataset is smooth, selecting a process comprising: for a given time stamp of the second dataset, generating an interpolated value via interpolation between values of the first time-series dataset having associated time stamps near the given time stamp, and including, as a pair in the aligned time-series dataset, the interpolated value and the value of the second time-series dataset associated with the given time stamp.

5. The method of claim 4, further comprising:
    identifying two interpolation values from the first time-series dataset, wherein the two interpolation values comprise: (i) a first value having an associated time stamp nearest the given time stamp among all the time stamps of the first time-series dataset greater than the given time stamp, and (ii) a second value having an associated time stamp nearest the given time stamp among all the time stamps of the first time-series dataset less than the given time stamp; and
    wherein interpolating between values of the first time-series dataset comprises using the two interpolation values and their associated time stamps to generate the interpolated value based on a linear interpolation between the two interpolation values evaluated at the given time stamp.

6. The method of claim 1, wherein selecting among the time alignment processes comprises:
    determining, based on the comparison, that both the first and second time-series datasets are smooth; and
    responsive to determining that both the first and second time-series datasets are smooth, selecting a process comprising: (i) for a given time stamp of the second dataset, generating an interpolated value via interpolation between values of the first time-series dataset having associated time stamps near the given time stamp, and including, as a pair in the aligned time-series dataset, the interpolated value and the value of the second time-series dataset associated with the given time stamp; and (ii) for a given time stamp of the first dataset, generating an interpolated value via interpolation between values of the second time-series dataset having associated time stamps near the given time stamp, and including, as a pair in the aligned time-series dataset, the interpolated value and the value of the first time-series dataset associated with the given time stamp.

7. The method of claim 1, wherein selecting among the time alignment processes comprises:
    determining, based on the comparison, that both the first and second time-series datasets are not smooth; and
    responsive to determining that both the first and second time-series datasets are not smooth, selecting a process comprising: (i) determining a temporal tolerance based on time spacings between consecutive time stamps in the first and second time-series datasets; (ii) identifying pairs of time stamps in the first and second time-series datasets that are within the determined temporal tolerance of one another; and (iii) including, as pairs in the aligned time-series dataset, pairs of values in the first and second time-series datasets associated with the identified pairs of time stamps.

8. The method of claim 7, wherein determining the temporal tolerance comprises:
    determining a median time spacing between consecutive time stamps in the first time-series dataset;
    determining a median time spacing between consecutive time stamps in the second time-series dataset;
    selecting a lesser of the two determined median time spacings; and
    using the selected median time spacing as a basis to determine the temporal tolerance.

9. The method of claim 1, wherein:
    determining the first degree of variance of the first set of values comprises determining an autocorrelation of the first set of values; and
    determining the second degree of variance of the second set of values comprises determining an autocorrelation of the second set of values.

10. The method of claim 1, wherein:
  determining the first degree of variance of the first set of values comprises dividing the first set of values into a set of time bins and determining standard deviations of the values within each time bin; and
  determining the second degree of variance of the second set of values comprises dividing the second set of values into a set of time bins and determining standard deviations of the values within each time bin.

11. The method of claim 1, wherein characterizing the first set of values comprises classifying the first set of values as being either smooth or not smooth.

12. The method of claim 1, wherein:
  determining the first degree of variance of the first set of values comprises determining an extent to which the first set of values deviates from an expected pattern for the first set of values; and
  determining the second degree of variance of the second set of values comprises determining a deviation of the second set of values from an expected pattern for the second set of values.

13. A system comprising:
  a communication interface;
  a user interface having a display; and
  a processing system to:
    receive a first time-series dataset and a second time-series dataset via the communication interface, wherein the first dataset comprises a first set of values associated with respective time stamps and the second dataset comprises a second set of values associated with respective time stamps;
    determine a first degree of variance of the first set of values and a second degree of variance of the second set of values;
    compare each of the first and second degrees of variance to a threshold;
    select among multiple time alignment processes based on the comparisons with the threshold;
    process the first and second time-series datasets in accordance with the selected time alignment process to thereby generate an aligned time-series dataset comprising a set of paired values associated with respective time stamps; and
    determine a correlation coefficient using the values of the aligned time-series dataset; and
    cause the user interface to display an indication of the determined correlation coefficient.

14. The system of claim 13, wherein the processing system further to:
  make a smoothness determination, based on the comparisons, that each of the first and second time-series datasets is either smooth or not smooth, wherein the multiple time alignment processes comprise: (i) a first process corresponding to both the first and second time-series datasets being smooth, (ii) a second process corresponding to one of the first and second time-series datasets being smooth and the other being not smooth, and (iii) a third process corresponding to both the first and second time-series datasets being not smooth; and
  wherein the processing system selecting among the multiple time alignment processes comprises the processing system selecting among the first, second, or third processes based on a correspondence between the selected process and the smoothness determination.

15. A non-transitory machine-readable storage medium encoded with instructions executable by a processor of a system to cause the system to:
  determine a first degree of variance of a first set of values and a second degree of variance of a second set of values, wherein the first set of values is included in a first time-series dataset in which the values are associated with respective time stamps, and the second set of values is included in a second time-series dataset in which the values are associated with respective time stamps;
  compare the determined first degree of variance of the first set of values to a threshold and characterizing the first set of values based on the comparison;
  compare the second degree of variance of the second set of values to the threshold and characterizing the second set of values based on the comparison;
  select a time alignment process among multiple time alignment processes based on the characterizations of the first set of values and the second set of values; and
  process the first and second time-series datasets according to the selected time alignment process to thereby generate an aligned time-series dataset comprising a set of paired values.

16. The non-transitory machine-readable storage medium of claim 15, wherein the instructions further cause the system to:
  determine, based on the comparisons, that the degrees of variance are either: (i) in a first state in which both are above the threshold, (ii) in a second state in which both are below the threshold, or (iii) in a third state in which one is above the threshold and one is below the threshold, wherein each of the first, second, and third states correspond to a respective one of three time alignment processes; and
  wherein the instructions that cause the system to select among the multiple time alignment processes comprise instructions that cause the system to select one of the three time alignment processes that corresponds to the determined state.

17. The non-transitory machine-readable storage medium of claim 15, wherein the time stamps of the first time-series dataset span a first interval and the time stamps of the second time-series dataset span a second interval that at least partially overlaps the first interval during an overlapping interval, and wherein the paired values of the aligned time-series dataset are associated with respective time stamps that span at least part of the overlapping interval.

18. The non-transitory machine-readable storage medium of claim 15, wherein the multiple time alignment processes comprise:
  a first process comprising: (i) generating a first set of interpolated values via interpolation of the first set of values at time stamps of the second time-series dataset, and including, in the aligned time-series dataset, each value in the first set of interpolated values paired with a value of the second time-series dataset associated with the time stamp of the interpolated value; and (ii) generating a second set of interpolated values via interpolation of the second set of values at time stamps of the first time-series dataset, and including, in the aligned time-series dataset, each value in the second set of interpolated values paired with a value of the first time-series dataset associated with the time stamp of the interpolated value;
  a second process comprising: generating a set of interpolated values via interpolation of values in a smooth one of the time-series datasets at time stamps of a not smooth one of the time-series datasets, and including, in the aligned time-series datasets, each value in the set of interpolated values paired with a value of the not smooth dataset associated with the time stamp of the interpolated value; and a third process comprising: (i) determining a temporal tolerance based on time spacings between consecutive time stamps in the first and second time-series datasets; (ii) identifying pairs of time stamps in the first and second datasets that are within the determined temporal tolerance of one another; and (iii) including, as pairs in the aligned time-series dataset, pairs of values in the first and second datasets associated with the identified time stamps.

* * * * *